June 1, 1926.
C. G. WHITE
1,587,097
TRACTION CHAIN
Filed August 12, 1925    2 Sheets-Sheet 1
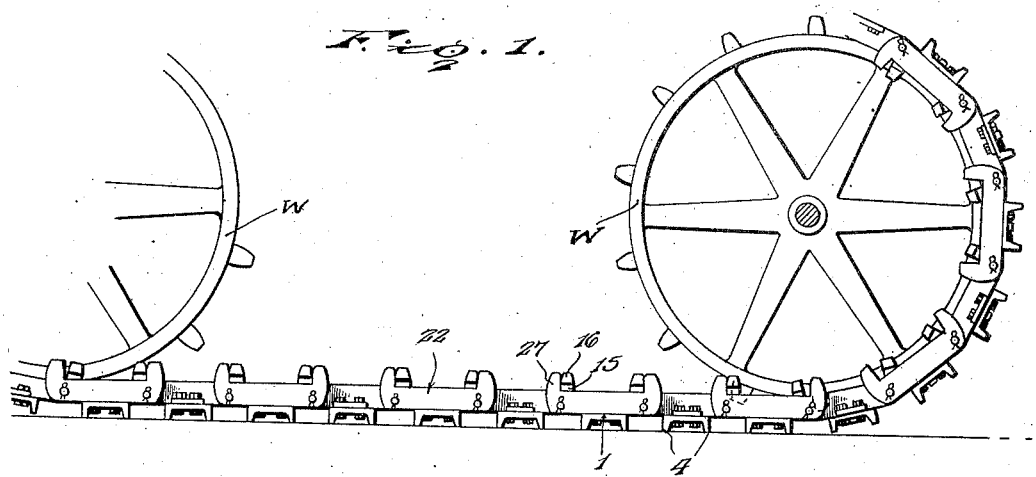
Inventor
C. G. White
By Lacey & Lacey, Attorneys

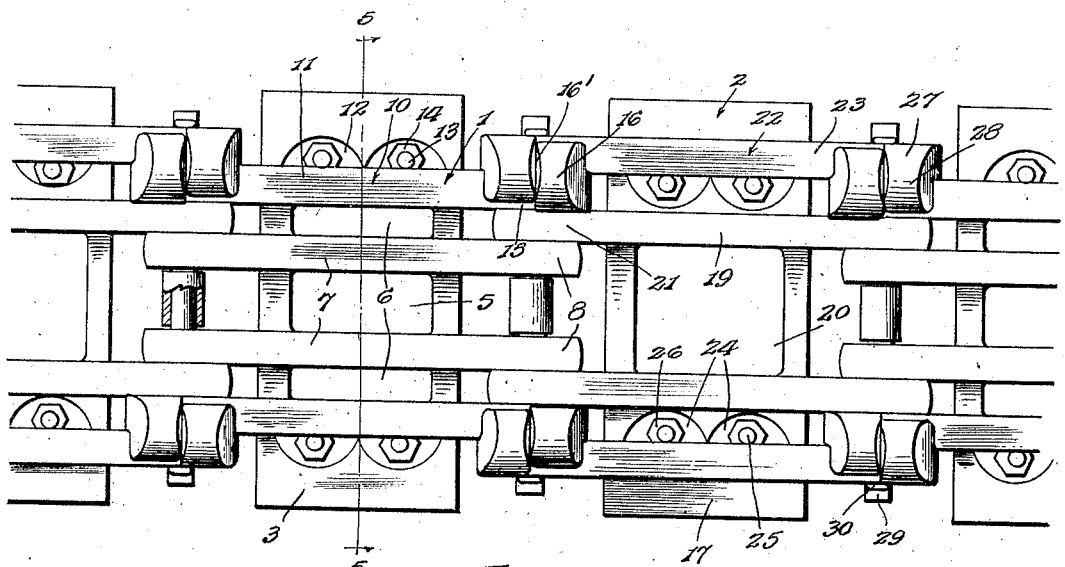
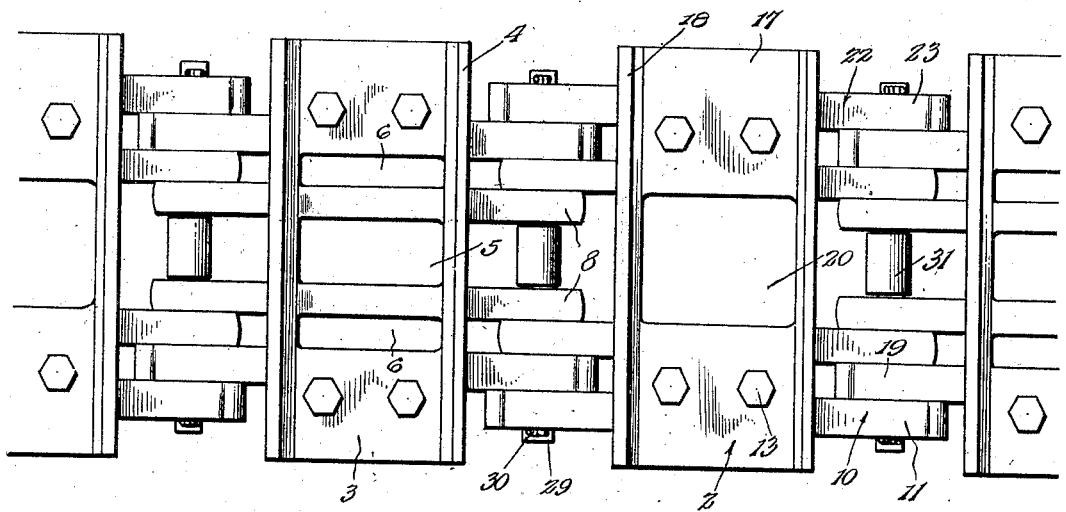
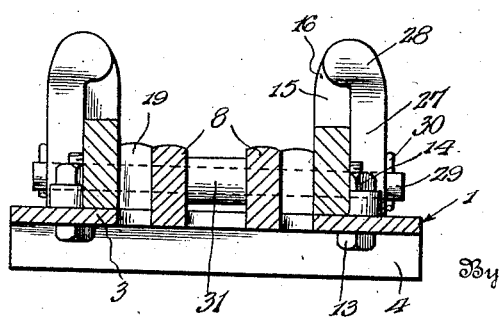

Patented June 1, 1926.

1,587,097

UNITED STATES PATENT OFFICE.

CHARLES G. WHITE, OF SAULT STE. MARIE, MICHIGAN.

TRACTION CHAIN.

Application filed August 12, 1925. Serial No. 49,833.

This invention relates to improvements in traction chains and more particularly to a traction chain for traction attachments for automobiles of that type embodying a replacement wheel for each rear wheel of the automobile, a wheel supported adjacent thereto, and a traction chain passing about the wheels and driven from the rear axle.

One of the objects of the present invention is to provide a chain of the class described in which the links will be so constructed that they will not be liable to become clogged with snow and thus impair the efficiency of the chain.

Another disadvantage which has attended the use of the ordinary traction chain of attachments of the character referred to above, is that the section or stretch of the chain which passes between the wheels of the attachment and in contact with the road surface, yields in an upward direction so that the chain is subjected to great tension and its tractive efficiency is reduced. Therefore, the present invention has as another object to provide a chain of the class described in which the links will be so constructed as to maintain the lower stretch of the chain taut while the chain is in motion, so that upward yielding of the lower or ground-engaging stretch of the chain will be prevented and thus the full tractive effect of the chain may be obtained.

Another object of the invention is to so construct the chain that any of the links thereof may be readily removed or disconnected in the event of breaking of a link, and a new link substituted therefor.

In the accompanying drawings:

Figure 1 is a side elevation of a portion of a traction chain embodying the invention, this view also illustrating in a general manner the character of the automobile attachment in connection with which the chain is employed.

Figure 2 is a perspective view of a portion of the chain.

Figure 3 is a plan view in detail of a portion of the traction chain embodying the invention, the view illustrating that side of the chain which is opposite the road-engaging side.

Figure 4 is a similar view illustrating the road-engaging side of the chain.

Figure 5 is a transverse sectional view taken substantially on the line 5—5 of Figure 3.

The chain comprises a series of connected links certain of which are indicated in general by the numeral 1 and others in general by the numeral 2. Each of the links 1 comprises a substantially oblong rectangular body member 3 having traction flanges 4 extending longitudinally of its outer side at the front and rear edges thereof, these flanges being preferably beveled or decreased in thickness in the direction of their engaging edges so as to enable the link to exert tractive force in traveling over hard snow or ice. The body 3 of each link 1 is formed with an opening 5 midway between its ends, and at opposite sides of the opening 5, with openings 6 which are narrower than the said opening 5. The body 3 is further formed upon its inner side with a pair of parallel upstanding combined reenforcing and pintle bars 7 which extend between the openings 6 and the opening 5 and have their end portions extended as at 8 beyond the front and rear sides of the body of the link and formed in their said extended end portions 8 with openings 9 to accommodate the hinge pins or pintles to be presently described. An abutment member, indicated by the numeral 10, is arranged upon the inner side of the body 3 of the link 1 immediately beside each of the openings 6 and parallel to the pintle bars 7, and each of these abutment members comprises a bar 11 provided with attaching ears 12, a pair of which ears is formed at the outer side of the bar and presented to the inner side of the body 3. Bolts 13 are secured through the ears 12 and through the body 3 of the link, and nuts 14 are threaded upon the bolts and tightened to bear against the said ears 12, the heads of the bolts bearing against the outer side of the body 3 as best shown in Figures 4 and 5 of the drawings. The ends of the bars 11 of the abutment members project beyond the front and rear sides of the body 3 to substantially the same distance as the pintle bars 7, as indicated by the numeral 15, and each bar 11 is formed upon its inner edge at each end with an abutment boss 16 which is directed laterally outwardly as best shown in Figures 2 and 3 of the drawings.

Each of the links 2 comprises a body member indicated by the numeral 17 and of oblong rectangular form and of the same dimensions as the body member 3 of the link 1, and, as in the case of the link 1, the body member 17 of the link 2 is formed upon its outer side with traction flanges 18 corresponding to the flanges 4. The body member is further formed with integral pintle bars 19 which extend parallel to each other and at opposite sides of an opening 20 formed centrally in the body member 17, and these pintle bars are spaced apart a sufficient distance to receive between their projecting end portions 21, the projecting end portions 8 of the pintle bars 7 of the associated links 1, as clearly shown in Figures 2, 3, 4 and 5 of the drawings. Abutment members indicated in general by the numeral 22 are provided upon the links 2 and each of these members comprises a bar 23 corresponding to the bar 11 previously described in connection with the links 1, the bar 23 being provided upon its inner side with a pair of attaching lugs 24 through which and the body of the link 2 are secured bolts 25, nuts 26 being threaded upon the bolts to bear against the said lugs 24, the heads of the bolts bearing against the outer side of the body 17 of the link. As in the case of the abutment bars 11, the bars 23 are extended at their ends beyond the front and rear sides of the link body with which they are associated and each bar is provided at its inner edge at each end with an abutment boss 27 which is turned laterally inwardly as indicated by the numeral 28. Pintle pins 29 are fitted through registering openings in the projecting ends of the pintle bars 7 and 19 and abutment bars 11 and 23 and serve to pivotally connect the links 1 and 2 in their alternately arranged relationship, as clearly shown in Figures 3 and 4 of the drawings, cotter pins or other suitable fastening elements 30 being assembled with the ends of the pintle pins to retain them in place. It will now be observed by reference to the drawings, and particularly Figures 2 and 3 thereof, that the projecting ends of the abutment bars 23 and 11 are overlapped and that when the links 1 and 2 are in alinement or, in other words, all occupy the same plane, as is the case, as shown in Figure 1, in the stretch of the chain which extends between the lower sides of the toothed traction wheels W, the abutment lugs 16 and 27 of companion links will squarely abut against each other so as to positively preclude any upward flexing of the said stretch of the chain, and in this manner, full benefit is obtained from the tractive force exerted by the chain in passing over the road surface. It will likewise be observed by reference to Figure 1, that as the chain passes around the traction wheels W, the links will move about their pins 29 and the abutment lugs will mutually separate.

It will be evident that due to the provision of the openings 5 and 6 in the links 1, and the openings 20 in the links 2, snow and ice are prevented from caking in the links to impair the efficiency of the chain. It will likewise be understood that due to the extension of the pintle bars 7 and 19 and the abutment bars 11 and 23 beyond the front and rear sides of the bodies of the links, the adjacent sides of the links are somewhat relatively spaced and, therefore, as the links pass around the traction wheels, their relatively adjacent sides will swing apart so as to dislodge any snow or ice which might have been accumulated in the passage of the links over the snow-covered road surface.

It will be observed by reference to the drawings, that the opposing faces of the abutment bosses 15 and 27 are rounded on longitudinal lines, as indicated by the numeral 16', so that when the said faces of the bosses engage each other, any snow accumulating between the faces or upon the bosses will be squeezed out, thereby tending to clear the chain of such accumulations.

The teeth of the traction wheel ride against anti-friction sleeves 31 which are freely rotatably mounted upon the pintle pins 29 and which sleeves rotate between the members 8, as clearly shown, for example, in Figures 3 and 4 of the drawings.

Having thus described the invention, what I claim is:

A traction chain comprising a series of links each including a body member having pintle bars upon its inner side, the pintle bars projecting beyond the opposite sides of the body and the pintle bars of alternate links being spaced apart a greater distance than the bars of the intervening links, whereby the projecting ends of the bars are overlapped between relatively adjacent links, parallel abutment bars upon each link, the abutment bars having their end portions projecting beyond the opposite sides of the respective links, the projecting end portions of the abutment bars of relatively adjacent links being overlapped, pintle pins fitted through the projecting ends of the pintle bars and abutment bars which are overlapped and pivotally connecting the links, and abutment bosses upon the ends of the abutment bars laterally offset in opposite directions whereby, when the links are in alinement the bosses upon the abutment bars of one link will abut the bosses upon the abutment bars of the next adjacent link and prevent further pivotal movement of the links in one direction.

In testimony whereof I affix my signature.

CHARLES G. WHITE. [L. S.]